UNITED STATES PATENT OFFICE.

537,096

CARL WITTKOWSKY, OF BERLIN, GERMANY.

PROCESS OF UNITING VENEERS.

SPECIFICATION forming part of Letters Patent No. 537,096, dated April 9, 1895.

Application filed September 28, 1891. Serial No. 407,066. (No specimens.) Patented in Germany April 15, 1891, No. 60,156; in France May 6, 1891, No. 213,303; in England May 15, 1891, No. 8,347, and in Austria-Hungary November 25, 1891, No. 21,265 and No. 43,553.

*To all whom it may concern:*

Be it known that I, CARL WITTKOWSKY, a subject of the King of Prussia, German Emperor, and a resident of Berlin, in the Kingdom of Prussia, German Empire, have invented a new Method of Producing a Waterproof Union Between Wooden Plates, (for which patents have been obtained in Germany, No. 60,156, dated April 15, 1891, filed in the name of Rudolf Pick, of Wien; in Austria-Hungary, No. 21,265 and No. 43,553, dated November 25, 1891; in France, No. 213,303, dated May 6, 1891, and in Great Britain, No. 8,347, dated May 15, 1891,) of which the following is an exact specification.

The purpose of my invention is to produce a waterproof union between wooden plates, especially between veneers, and my invention is based upon the preparation and application of a cementing medium possessing the peculiar property of being at first soluble in water, and remaining so even after being coated on, and dried, but becoming insoluble in water—*i. e.*, waterproof—as soon as it is exposed to the simultaneous influences of pressure and heat. In fact, the cementing-medium in question is exposed to the said latter two influences only after it is coated onto the respective surfaces and dried; and I wish to call special attention to the fact, that by heating the dried cementing medium, the latter is not simply melted, but is caused to undergo a chemical action, whereby the soluble cementing-medium is converted into an insoluble one.

In carrying my invention into effect, I first mix lime with caseine in a proportion of about eight parts of lime to one hundred parts of caseine; and I then add to the pulpy mass so obtained waterglass in a quantity of from ten to thirty-five parts, this addition being made as quickly as possible in order to prevent the said former mixture from binding, *i. e.*, becoming solid. After the waterglass has been added, there arises at first a deposit, which, however disappears after some time. There then results a slimy mass, that may be diluted with water in any requisite proportion. The wooden plates, or veneers respectively, are furnished with thin layers of the said mass, after the latter, if necessary, has been diluted. Owing to its being able to dissolve in water, or to mix with the same, the distribution and spreading out of the mass are greatly facilitated. The said layers are then allowed to dry. It is remarkable, that neither in its dried state nor in its previous liquid one a great adhesive capacity is shown by the mass. If, now, the veneers having the dried coating or coatings of my cementing-medium, are put one upon the other, and are exposed to a great pressure, and simultaneously therewith to heat of about 100° Centigrade, there will arise some reactions, at the end of which the soluble mixture will have been converted into an insoluble compound.

The chemical process is the following: The three substances, caseine, lime and waterglass, which have been mixed at ordinary temperature, have formed some provisional or preliminary combinations representing in their entirety a soluble compound. If the latter when dried is acted on by pressure and heat, said combinations are decomposed, and a final compound consisting of insoluble silicate of lime and coagulated albumen is formed. I wish to call attention to the fact, that the formation of said final compound is due not solely to the heat, but to the strong pressure, too. By perfectly excluding the air by means of said pressure while the chemical reactions take place, the albumen in spite of its coagulation remains thoroughly mixed with the silicate of lime, and its gluing-capacity is thus made useful for the union of the veneers in the fullest degree.

I wish it to be understood, that I need not coat both the wooden plates that are to be united. Coating but one of them will be sufficient to attain the desired waterproof union. The time during which the plates are exposed to pressure and heat need last but from three to six minutes. As the heat is transferred to the dried coating or coatings by the mediation of the wooden plates, and as the latter are permitted to be heated only in the very moment of their union, it will be obvious, that the method above described is specially adapted for the union of veneers, and, in fact, has been devised especially for that purpose.

I am well aware, that prior to my invention mixtures of caseine and lime, and also of caseine, waterglass and magnesia, have been used as cements. These, however, had the serious drawback, that, first, they became solid in a very short time directly after the mixing, and could thereafter no more be reduced to their previous sticky state. The previous sticky state, however, is so short that it is impossible to use cements of the said older sorts on a commercial scale; second, said older cements can be used for articles only, which by reason of the elementary substances they contain are capable of causing by themselves the chemical transformation of the components of the cement. It has not been cognizant up to now, that a cementing-medium consisting of caseine, lime, and waterglass may be maintained in a soluble and ineffective state while cold and dry, and become effective and insoluble by applying pressure and heat.

Having thus fully described the nature of this invention, what I desire to secure by Letters Patent of the United States is—

The method of producing a waterproof union between veneers, consisting in coating the respective surfaces with a mixture soluble in water, and composed of caseine, lime and waterglass; letting said coatings become dry; and exposing the veneers with their coatings to the simultaneous influence of pressure and heat so as to effect thereby the union, and cause the soluble mixture to be converted into an insoluble compound, substantially as described.

In testimony whereof I have signed this specification in the presence of two subscribing witnesses.

CARL WITTKOWSKY.

Witnesses:
R. HERPICH,
E. SCHULTZE.